No. 722,465. PATENTED MAR. 10, 1903.
C. SUDBRINK.
WATER CLOSET SEAT.
APPLICATION FILED FEB. 1, 1902.
NO MODEL.
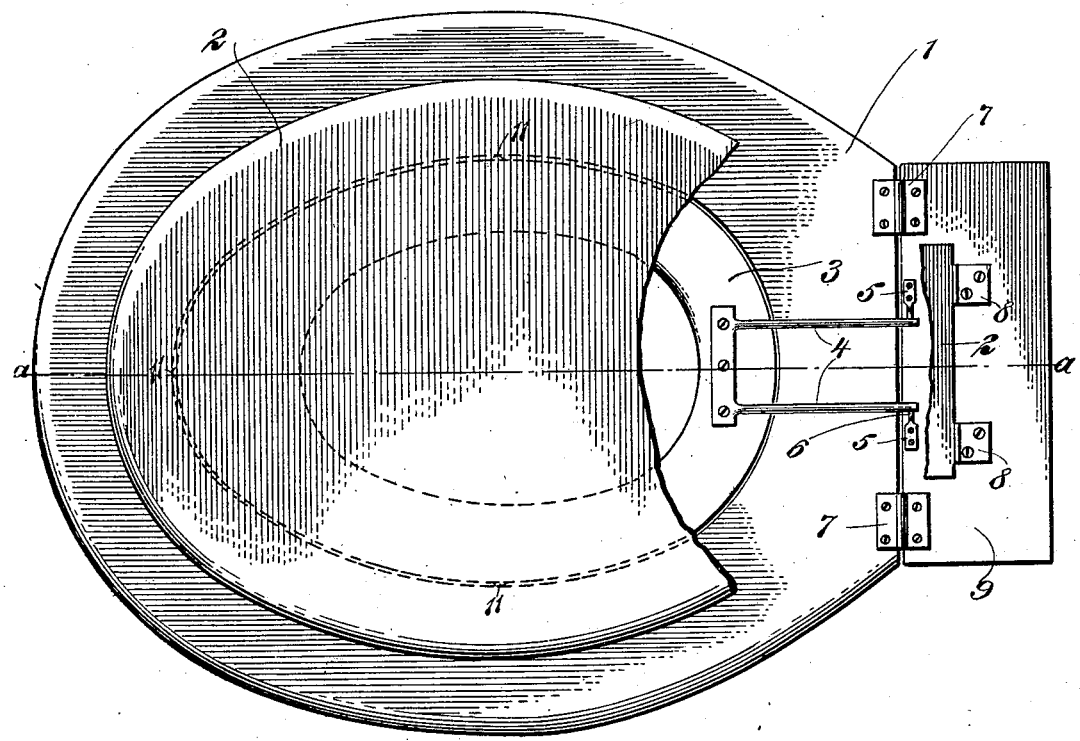
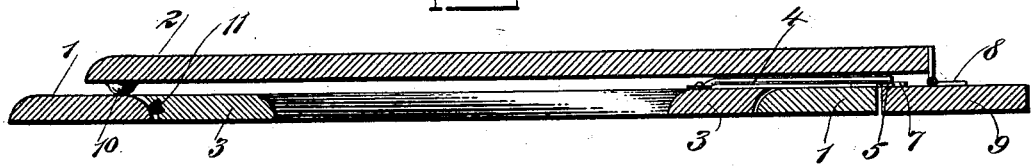
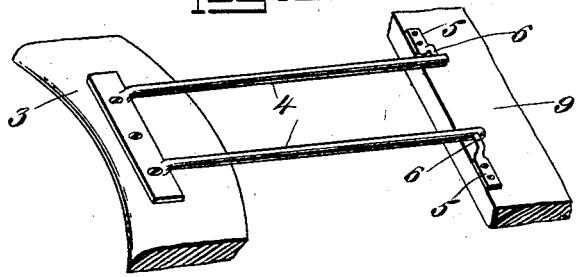
WITNESSES:
INVENTOR.
Charles Sudbrink,
BY A. M. Pierce,
ATTORNEY.

UNITED STATES PATENT OFFICE.

CHARLES SUDBRINK, OF NEW YORK, N. Y.

WATER-CLOSET SEAT.

SPECIFICATION forming part of Letters Patent No. 722,465, dated March 10, 1903.

Application filed February 1, 1902. Serial No. 92,118. (No model.)

*To all whom it may concern:*

Be it known that I, CHARLES SUDBRINK, a citizen of the United States, residing in the city, county, and State of New York, have invented a new and useful Improvement in Water-Closet Seats, of which the following is a specification.

My invention relates especially to the construction and arrangement of seats for water-closets, and has for its object the provision of a seat for the use of adults or children.

To attain the desired end, my invention consists in certain novel and useful combinations or arrangements of parts and peculiarities of construction and operation, all of which will be hereinafter first fully described and then pointed out in the claim.

In the accompanying drawings, forming a part hereof, Figure 1 is a plan view of my improved water-closet seat. Fig. 2 is a vertical cross-sectional view at line $a\,a$ of Fig. 1. Fig. 3 is a perspective view of the detachable hinge which carries the smaller inner seat.

Like numerals of reference whenever they occur indicate corresponding parts in all the figures.

1 is the main or larger seat, made in the usual manner and hinged at 7 to a back piece 9.

2 is the usual cover, hinged at 8 to a back piece 9.

10 represents the usual rubber supports for the cover.

3 is a second or smaller seat arranged to fit within the main seat 2, its outer periphery conforming to the curvature of the inner edge of said larger seat, so as to be supported thereby, leaving substantially a flush joint between the meeting edges of the seats 1 and 3.

11 represents elastic stops projecting slightly from the periphery of the seat 3, said stops lightly but firmly holding the two covers together, while at the same time they prevent any jar in closing the cover 3 into the cover 1.

4 is a portion of the hinge secured to the seat 3.

5 5 are the two portions of the hinge secured to the back piece 9 and having pintles 6, which engage in perforations in the extremities of the two arms of the portion 4 of the hinge. By this construction if it is desired to entirely remove the seat 3 the arms of the hinge are pressed together, releasing them from the pintles. In replacing the seat 3 this operation is repeated, so as to cause the parts of the hinge to reëngage, thus providing simple and effective means for rendering the smaller seat removable at pleasure.

When constructed and arranged in accordance with the foregoing description, it will be seen that the two seats may be thrown back together or the smaller seat alone, as desired, and when the device is used by a child a substantially smooth seat is provided, and that the smaller seat may be easily applied to the large seats now in use without trouble or making alterations.

Having now fully described my invention, what I claim as new therein, and desire to secure by Letters Patent, is—

The combination of a hinged water-closet seat, a smaller seat shaped to fit within the hole of the larger seat so that the upper faces of the two occupy substantially a common plane, a hinge for the smaller seat extending over the main seat and having the axis about which it swings approximately coincident with the axis about which the main seat turns, whereby the smaller seat may be turned up independently of the larger one, or the two seats may be turned up together, and a cover for the two seats hinged at a point back of the common hinge-line of the seats, the hinge for the smaller seat being arranged between the face of the cover and the upper faces of the two seats, substantially as set forth.

Signed by me at New York this 28th day of January, 1902.

CHARLES SUDBRINK.

Witnesses:
 WM. SUDBRINK,
 LOUIS BUONONATE.